Figure 1:
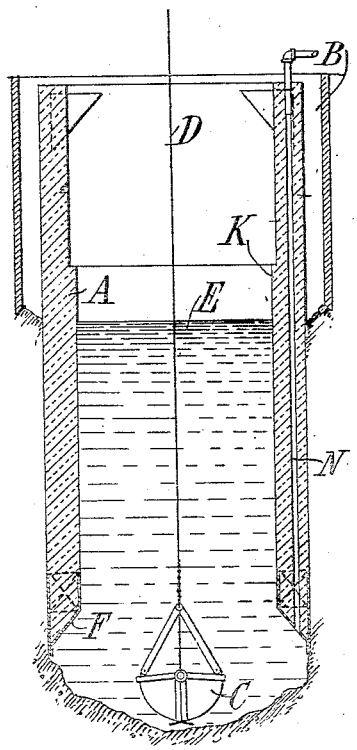

D. E. MORAN, J. W. DOTY & E. S. JARRETT.
SINKING SHAFTS AND THE LIKE.
APPLICATION FILED FEB. 15, 1909.

933,776.

Patented Sept. 14, 1909.
5 SHEETS—SHEET 1.

WITNESSES:
Fred White
René Bruine

INVENTORS:
Daniel E. Moran, John W. Doty,
and Edwin S. Jarrett,
By Attorneys.

D. E. MORAN, J. W. DOTY & E. S. JARRETT.
SINKING SHAFTS AND THE LIKE.
APPLICATION FILED FEB. 15, 1909.
933,776.
Patented Sept. 14, 1909.
5 SHEETS—SHEET 2.
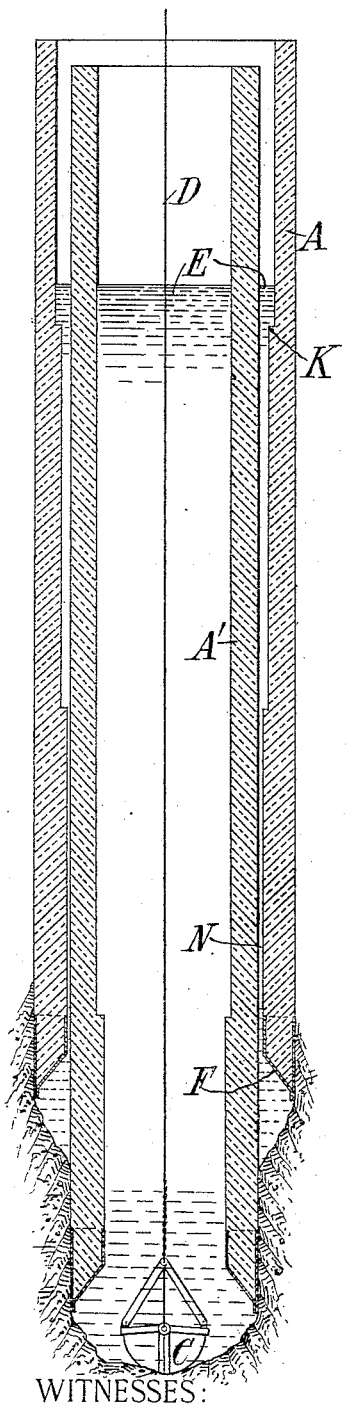
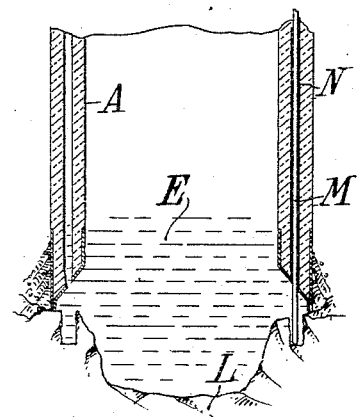
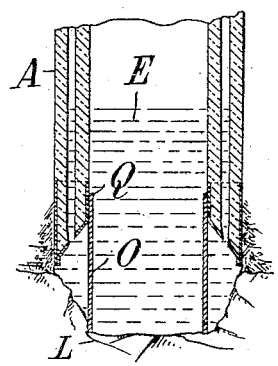
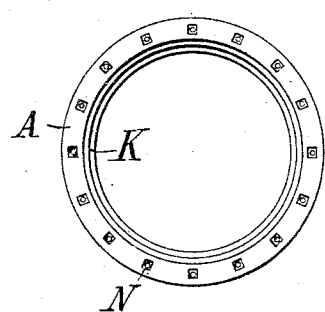
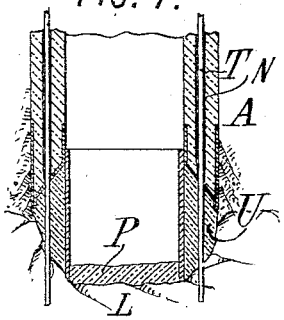
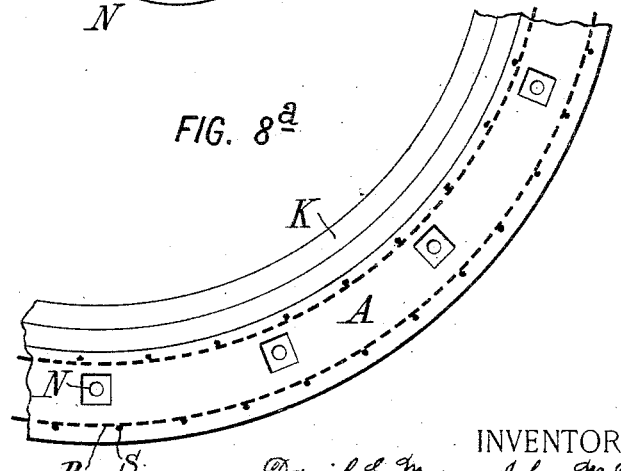
WITNESSES:
Fred White
René Bruine
INVENTORS:
Daniel E. Moran, John W. Doty
and Edwin S. Jarrett,
By Attorneys D. E. MORAN, J. W. DOTY & E. S. JARRETT.
SINKING SHAFTS AND THE LIKE.
APPLICATION FILED FEB. 15, 1909.
933,776.
Patented Sept. 14, 1909.
5 SHEETS—SHEET 3.
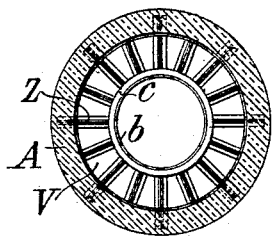
FIG. 11.
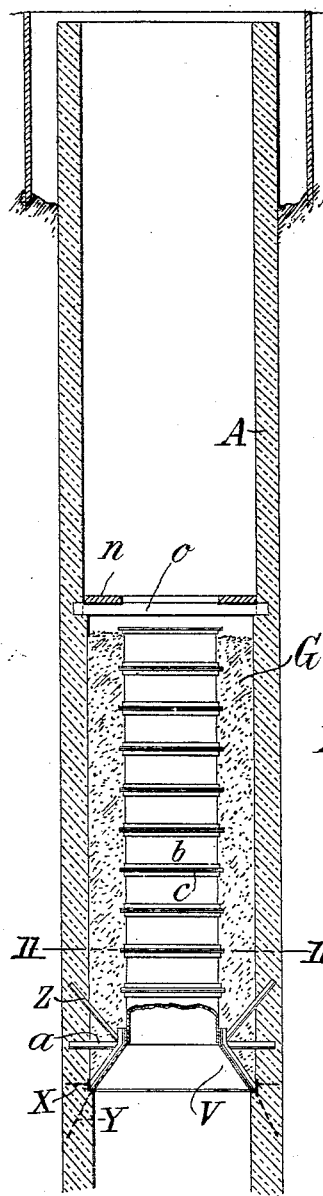
FIG. 9.
FIG. 12.
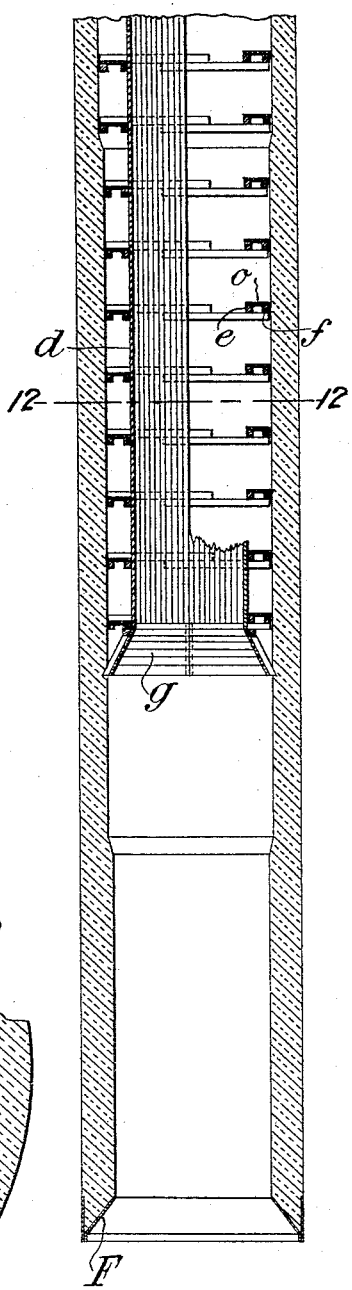
FIG. 10.
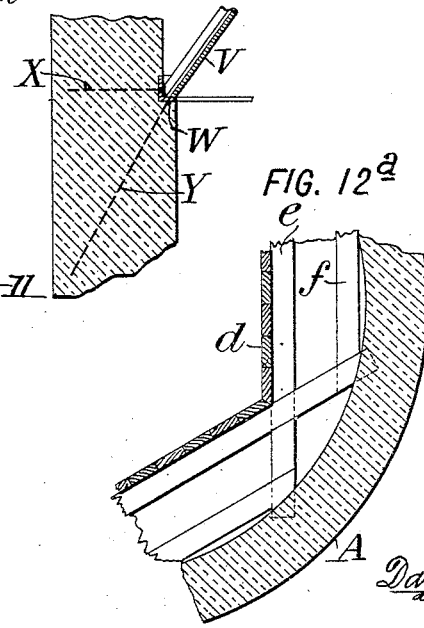
FIG. 9.ª
FIG. 12.ª
WITNESSES:
Fred White
Rene Bruine
INVENTORS:
Daniel E. Moran, John W. Doty,
and Edwin S. Jarrett,
By Attorneys
Arthur E. Fasert Uama D. E. MORAN, J. W. DOTY & E. S. JARRETT.
SINKING SHAFTS AND THE LIKE.
APPLICATION FILED FEB. 15, 1909.

933,776.

Patented Sept. 14, 1909.
5 SHEETS—SHEET 4.

WITNESSES:
Fred White
René Bruine

INVENTORS:
Daniel E. Moran, John W. Doty,
and Edwin S. Jarrett,
By Attorneys.
Arthur C. Fraser Ulma

ANDREW. B. GRAHAM CO., PHOTO-LITHOGRAPHERS, WASHINGTON, D. C.

D. E. MORAN, J. W. DOTY & E. S. JARRETT.
SINKING SHAFTS AND THE LIKE.
APPLICATION FILED FEB. 15, 1909.
933,776.
Patented Sept. 14, 1909.
5 SHEETS—SHEET 5.
FIG. 15.
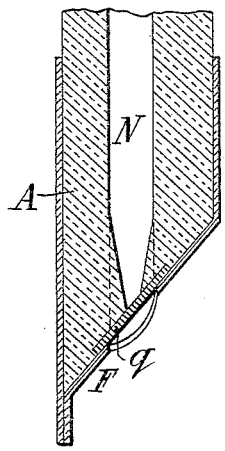
FIG. 16.
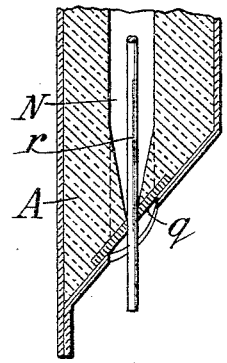
FIG. 17.
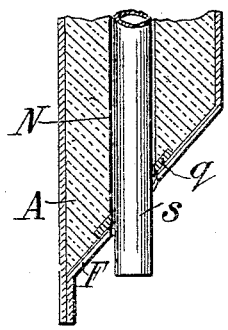
FIG. 18.
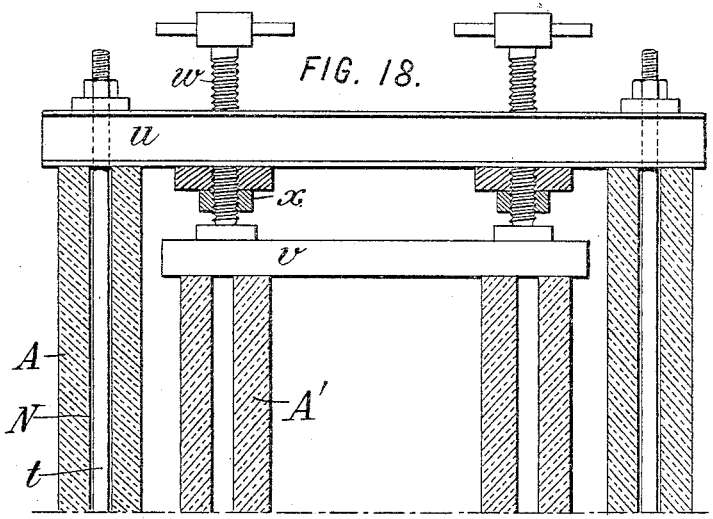
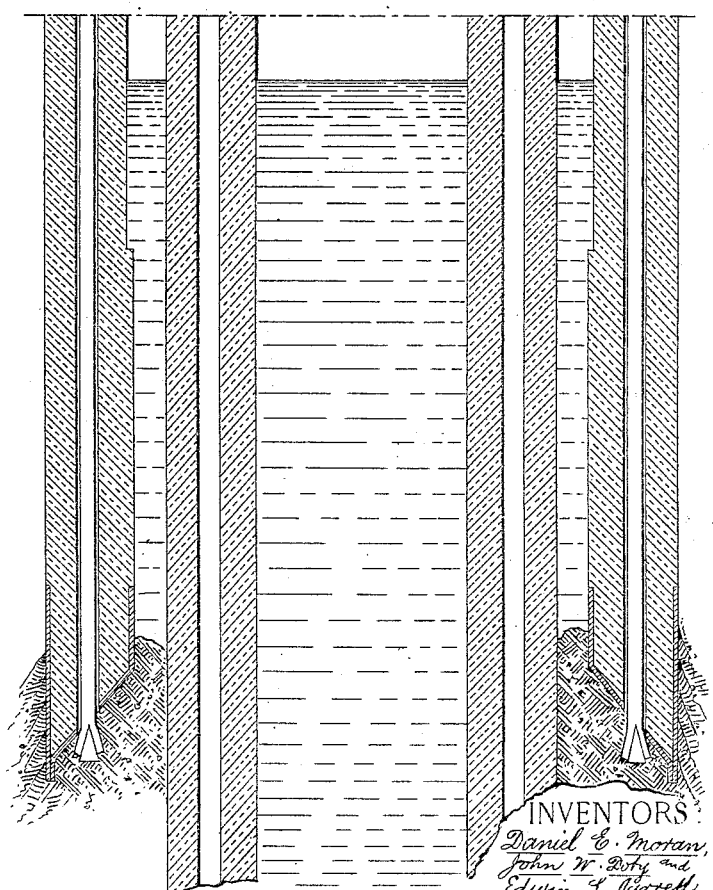
WITNESSES:
Fred White
René Bruine
INVENTORS:
Daniel E. Moran,
John W. Doty and
Edwin S. Jarrett,
By Attorneys,

UNITED STATES PATENT OFFICE.

DANIEL E. MORAN, OF MENDHAM, NEW JERSEY, AND JOHN W. DOTY AND EDWIN S. JARRETT, OF NEW YORK, N. Y.

SINKING SHAFTS AND THE LIKE.

933,776.  Specification of Letters Patent.  Patented Sept. 14, 1909.

Application filed February 15, 1909. Serial No. 478,070.

*To all whom it may concern:*

Be it known that we, DANIEL E. MORAN, a citizen of the United States, residing at Mendham, in the county of Morris and State of New Jersey, JOHN W. DOTY, a subject of the King of England, residing in the borough of Brooklyn, county of Kings, city and State of New York, and EDWIN S. JARRETT, a citizen of the United States, residing in the borough of Manhattan, city, county, and State of New York, have jointly invented certain new and useful Improvements in Sinking Shafts and the Like, of which the following is a specification.

The invention is especially designed for the sinking of mining shafts with a concrete or similar molded curb or lining to a stratum of rock or the like, and the uniting of the curb to the rock with a substantially water-tight joint so as to permit the pumping out of the shaft. Various features of the invention are also adapted for use in connection with curbs of other materials, and in various classes of work ordinarily performed by open excavation or under compressed air; open methods of excavation including such operations as dredging &c. which are carried out at atmospheric pressure either with or without the removal of water.

The invention in its most specific form is especially useful in going below the limit at which air pressure can be used to exclude the water, this limit being about 100 feet. In going to extreme depths one curb is sunk inside of another. Preferably the rock at the bottom is blasted out to a point below the lower or cutting edge, and the curb is continued below the top of the rock. There are several other steps which are preferably but not necessarily employed. A packing cylinder may be introduced at the bottom, the space within said cylinder dredged, and the curb continued outside of said cylinder and the bottom concreted so as to make a good joint with the rock. Vertical passages may be provided for admitting water jets to soften earth, clay, or any other obstruction of the cutting edge, and for introducing blasting charges into the rock below the curb so as to widen the opening and facilitate the introduction of the packing cylinder. The same passages when made through the curb as is preferable, may be used finally to introduce concrete in continuation of the lower end of the curb and to carry rods which strengthen the curbing, and if desired fasten it to the rock. Special means may be introduced for supporting weights which are to assist in the forcing down of the curb.

The accompanying drawings illustrate embodiments of the invention.

Figure 2:
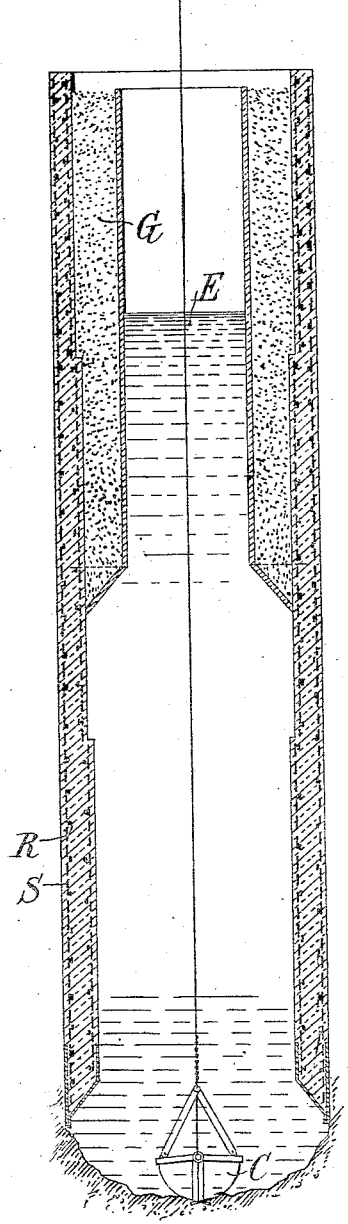
Figure 3:
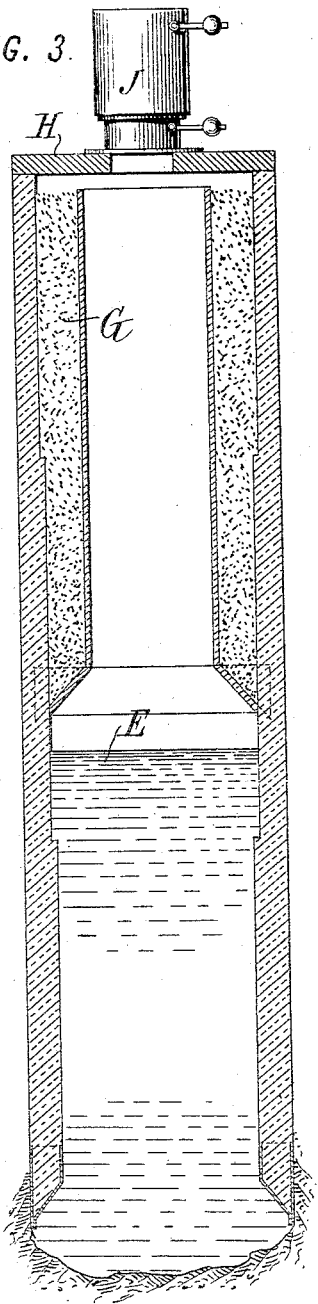
Figure 13:
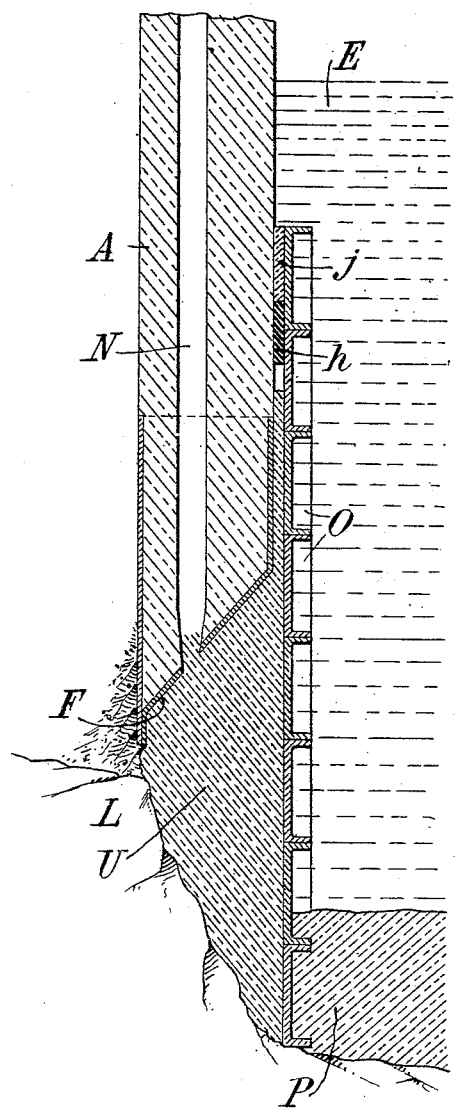
Figure 14:
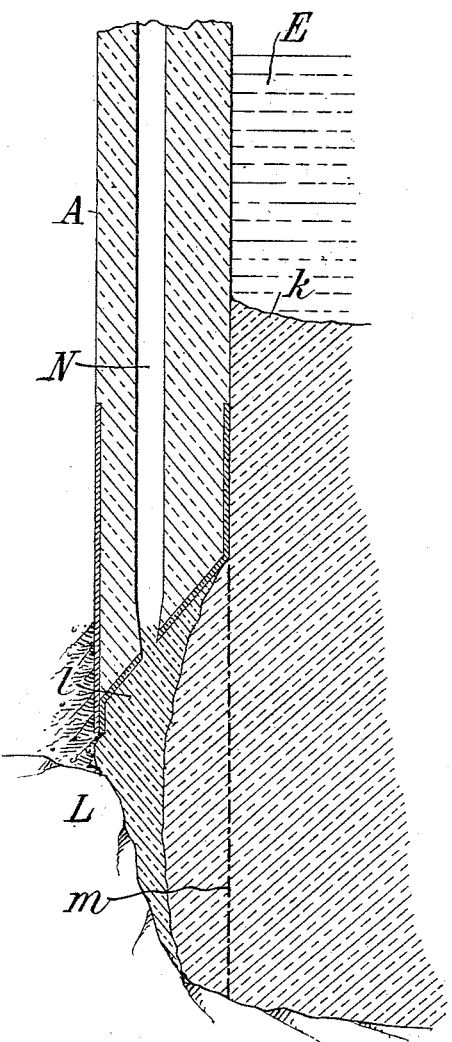

Figure 1 is a vertical diametral section of a shaft in the first stage of the sinking operation; Fig. 2 is a similar section in a more advanced stage of the work; Fig. 3 is a similar section at another stage; Figs. 4, 5, 6 and 7 are similar sections in other stages of the work; Fig. 8 is a plan of the curb; Fig. 8$^a$ is an enlarged segment of the same; Fig. 9 is a section showing the special means for supporting an extra weight; Fig. 9$^a$ is an enlarged detail of Fig. 9; Fig. 10 is a section similar to Fig. 9, showing another weight supporting means; Figs. 11 and 12 are horizontal sections respectively of Figs. 9 and 10; Fig. 12$^a$ is an enlarged detail of Fig. 12; Figs. 13 and 14 are enlarged sectional details of joints of the bottom curb with the rock; Figs. 15, 16 and 17 are sectional details of the base or cutting edge of a curb; Fig. 18 is a vertical section of an alternative method.

Referring to the embodiment of the invention illustrated, the sinking is accomplished by what is known as the drop method, namely, the dropping of the curb from the top downward as the excavation progresses (in contradistinction to the method by adding new sections of curb at the bottom). The curb A is preferably of concrete which is molded between suitable forms in an excavation B at the surface, as described more in detail in the application of Daniel E. Moran filed October 15, 1907. The excavation may be carried on by various open air methods, typified in the drawings by a clam-shell dredging bucket C suspended from cables D; the water E being ordinarily allowed to stand at its normal level within the curb. The concrete curb is preferably provided with a shoe F of sheet steel consisting of plates on the lower faces with braces between them and embedded in the concrete. When the friction becomes so great as to interfere with the sinking of the curb, weights may be added consisting for example of a quantity of sand G supported from suitable brackets tied or embedded into the concrete. The weight or ballast G should preferably be limited to extend downward from the top not more than about 100 feet, so that a roof H may be placed on top of the curb, as in Fig. 3, and an air lock J applied thereto, and air pressure applied to force down the level of the water E below the weight supporting structure to permit the easy removal of the latter; the weight, if on sand, falling into the bottom where it can afterward be dredged out, or being removed through the air lock. Or if the weight be water (as might be the case when working under pressure), there will be no need of removal, since it would gradually assume the normal hydrostatic level.

When a shaft has been carried as far as possible or as desired with the first curb A, a second curb A′ of smaller diameter is lowered therethrough. This second curb, of course, will be free of friction throughout the portion of its length which is within the outer curb A. The excavation will proceed in the same way as indicated in Fig. 4 by the clam-shell bucket C. Each of the curbs is preferably molded with an inside diameter which increases upwardly, as by steps or shoulders K, so as to permit the curb's working more or less out of plumb as it sinks, and to nevertheless preserve an inside face which does not overhang, and which does not therefore interfere with the vertical path required for the excavating bucket, or for an inner curb A′ or the like.

Fig. 5 shows the curb A or A′ sunk to approximately its desired lower level and the rock bottom L blasted or broken and excavated as far as it can be by the bucket. This leaves a ridge of rock under the curb. If it is desired to broaden the excavation at the bottom, drills M are lowered, as shown in Fig. 5, through vertical passages N so as to drill blast holes into which cartridges are afterward inserted and the excavation widened as in Fig. 6. Thereupon a packing cylinder O is introduced as in Fig. 6. This packing cylinder is hereinafter described in fuller detail. After the packing cylinder is in, to form a continuation of the inner face of the curb, the space outside of the packing cylinder is concreted with grout through the passages N to form a surrounding body of concrete U which constitutes a continuation of the original curb to a depth below the top of the rock. If there is any leakage through the bottom, a bottom layer of concrete P is applied. The cylinder O does not necessarily fit the curb tightly, but if there is any leakage through the concrete U its upper edge may be packed. Reinforcing rods or anchors T may be introduced through the vertical passages N above referred to, so as to tie the rock and the body of concrete U to the upper part of the curb. The concrete is preferably reinforced by two sets of horizontal rods R and two sets of vertical rods S, the vertical and horizontal rods of the inner reinforcement being preferably tied together and also those of the outer reinforcement. Between the inner and the outer reinforcements are located the vertical passages N.

Various structures may be provided for supporting the extra weight G previously referred to. In Figs. 9 and 11, we have shown a steel structure for this purpose, and in Figs. 10 and 12 a timber structure. In the former case a frusto-conical ring V of steel is supported upon a shoulder of the curb, which shoulder is reinforced by an angle iron W, the base V being stiffened by angles on its outer face, and being fastened down by ties X and Y embedded in the curb. Braces Z and $a$ steady the upper part of the base and have their ends embedded also in the concrete curb. Upon the base V are mounted cylindrical sections $b$, preferably bolted together by means of outside flanges $c$ with water-tight packing between them. The inside shaft constituted by these sections is built up section by section as the main shaft A is sunk, so as to maintain the inside shaft above the top of the water.

Where a timber weight-retaining shaft is desired, it is preferably made with a hexagonal or other polygonal opening which permits of the swinging of the dredge rope close to the inner face of the curb (at the angles of the polygon, while securing the maximum amount of room for ballast. The shaft consists of vertical staves $a$ made preferably of tongue and groove sheeting, and braced and supported by attachment to the inside of cross braces $e$ and $f$, whose ends are embedded in the concrete, or supported in notches in the concrete. The base $g$ is of corresponding pyramidal shape with its lower edges supported by the concrete curb.

At intervals in the height of the ballast G (Figs. 9 and 10) supplementary supports are preferably provided for taking parts of the load and distributing it throughout the height of the curb. In Fig. 9 such a supplementary support is indicated by a floor $n$ supported upon beams $o$ having their ends embedded in or supported upon an inside shoulder of the curb; the floor $n$ being adapted to permit the passage of the next tubular section $b$. Similar floors $o$ are shown at short intervals in Fig. 10.

Various other means than those heretofore specifically described may be used for making a substantially water-tight joint at the bottom of the curb, so as to permit the pumping out of the shaft, and the carrying forward of the mining operations in the rock. Figs. 13 and 14 illustrate on a large scale two convenient methods by providing inside extension walls and subsequently extending or continuing the curb itself. The packing cylinder O is made up of ribbed cast iron segments, and when completed is lowered from the top of the shaft into place. Or it may be made of a light tube of reinforced concrete, or of sheet metal, or any other suitable material. It has a free fit in the curb A. The passages N in the curb are preferably of substantial size, say 6 inches square or 6 inches in diameter, except at the bottom, where they are reduced to say 2 inches to form a good water jet. When a drill is to be introduced, its weight is sufficient to break out the restricted wall at the bottom of the passage, and also to break through the thin shell of which the shoe F is formed. Valves or other means permitting the same mode of operation may be adopted if desired. The packing cylinder O forms the inner side of an annular space which is easily filled with a body U of concrete as previously described, by passing grout through the passages N, and the concrete P at the bottom may be laid by various known apparatus for depositing concrete under water. If there is still some leakage over the top of the packing cylinder O, it may be prevented by introducing a packing ring $h$ of oakum or a "moss-box" or the like and introducing a ring of concrete $j$ above it.

Another method of making the joint by continuing the curb to a point below the rock surface is indicated in Fig. 14. After the curb A is brought as near as possible to the rock L, the rock is hollowed out by the methods previously described, and a body $k$ of concrete deposited thereupon and extending some distance into the curb. The sides are filled out if necessary by a body $l$ of concrete deposited through the vertical passages above referred to. When the concrete $k$ and $l$ has hardened sufficiently, the shaft is pumped out and the concrete $k$ broken out along the dotted line $m$, forming substantially a continuation of the inner face of the curb, the line $m$ being carried clear to the rock, or stopping a little short thereof according to circumstances.

The passages N will usually be filled with concrete when the work is done, embedding tie rods T where they have been introduced.

The construction of the base or cutting edge of the curb may be variously modified to facilitate the various uses to which the vertical passages N are put. The passages N may be stopped by valves or concrete walls, or merely by the steel plate F; or they may be made of the very simple and convenient design shown in Figs. 15, 16 and 17. The passages N in this case are first molded of full diameter clear to the bottom, as indicated in dotted lines, a hole being left in the metal plate F of approximately the same size as the passage N, and a thin board or other breakable cover $q$ being arranged over the hole in the plate F. The concrete is then built up on the wooden plate $q$ to form the conical mouth piece or nozzle. When it is desired to use the passages N for jets of water, or for a small drill or rod or the like, a small hole is broken in the plate $q$ by means of a drill $r$ as in Fig. 16. When it is desired to make a larger opening, as for example for the insertion of a pipe $s$ (Fig. 17), the opening is made of the full size of the passage N by drilling out the concrete which contracts the mouth of the passage, and by breaking a large hole through the breakable plate $q$. These passages are adapted to be applied in a great variety of ways to the continuing of the work of excavation and the sinking of the curb. For example they may be very conveniently used for the introduction of freezing pipes into the material below the lower edge of the curb, or pipes for injecting grout into the surrounding earth, or various other means for hardening the earth so as to facilitate its excavation. For example, with these vertical passages made six inches square or six inches in diameter, four-inch freezing pipes may be introduced through them, and these pipes may be of any known or suitable design. Various designs exist by which the freezing effect could be restricted to the portion of the pipe which extends below the bottom of the curb.

Where there is any difficulty in arranging ballast within the shaft to assist in the sinking of the curb, jacks may be used for the purpose, the upward thrust being taken by "dead men" suitably driven into the ground around the site. In introducing an interior shaft, there is comparatively little room left for ballast. In such cases, we may very advantageously use the outer curb as a means for resisting the reaction of jacks which force down the inner curb. Such an operation is indicated in Fig. 18, showing again a special utility in the vertical passages N. Through these passages of the outer curb A are dropped tie rods $t$ provided with expanding heads at their lower ends by which after they are lowered they will resist an upward pull. These rods $t$ are fastened down at the top upon a supporting structure consisting of one or more cross beams or girders $u$. The inner curb A' is covered at the top with any suitable system of cross beams or girders $v$, and upon these bear the lower ends of screw jacks $w$, the upward thrust of which is taken by nuts $x$ braced up against the under side of the cross beams $u$.

What we claim is:—

1. In the sinking of shafts, the method which consists in forming a curb of concrete, sinking the same, adding successive sections at the top as the sinking proceeds, and forming a second similar curb and sinking it through and below the first.

2. In the sinking of shafts, the method which consists in constructing a curb of increased inner diameter at its upper end and sinking the same, and forming a second smaller curb and sinking it within and below the first.

3. In the sinking of shafts, the method which consists in forming and sinking a curb of concrete to rock, removing the rock below the plane of the bottom edge of the curb, and continuing the curb to a point below the top of such rock.

4. In the sinking of shafts, the method which consists in forming and sinking a curb of concrete to rock, adding successive sections at the top as the sinking proceeds, removing the rock below the bottom edge of the curb, and continuing the curb to a point below the top of such rock.

5. In the sinking of shafts, the method which consists in sinking a curb and providing an inside extension covering the joint between the bottom of the curb and the stratum below, and continuing the curb outside of said extension.

6. In the sinking of shafts, the method which consists in sinking a curb and introducing a packing cylinder within and covering the joint between the bottom of the curb and the stratum below, and continuing the curb outside of said cylinder.

7. In the sinking of shafts, the method which consists in sinking a curb provided with vertical passages, and extending the curb at its lower end by passing material through said passages.

8. In the sinking of shafts, the method which consists in sinking a curb provided with vertical passages, introducing tie rods through said passages and tying said curb to the material below it by means of said tie rods.

9. In the sinking of shafts, the method which consists in providing and sinking a curb with passages therein, and afterward inserting reinforcing rods in said passages.

10. In the sinking of shafts, the method which consists in providing and sinking a curb assisting said sinking by ballast supported within the curb and below the water level, and lowering the water below the supporting means for said ballast and removing said means under air pressure.

11. In the sinking of shafts, the method which consists in sinking an annular curb provided with vertical passages at intervals in its annular length, and introducing through said passages and in line with the curb means for hardening the earth below said curb.

12. In the sinking of shafts, the method which consists in sinking an annular curb provided with vertical passages at intervals in its annular length, and introducing pipes through said passages and in line with the curb, and circulating a freezing mixture through said pipes to freeze the earth below said curb.

13. In the driving of shafts, the method which consists in driving an annular curb provided with longitudinal passages in its annular length by excavating through its center and hardening the earth beyond said curb by introducing hardening means through said passages and in line with the curb, and continuing the excavation through said hardened earth.

14. In the sinking of shafts, the method which consists in sinking an outer shaft and jacking down an inner shaft utilizing the outer shaft to take the upward reaction of the jacks.

15. In the sinking of shafts, the method which consists in sinking an outer shaft with vertical passages therein, tying a cross beam to said outer shaft by means of rods introduced into said passages, and jacking down an inner shaft with jacks arranged to react against said cross beam.

16. A concrete curb for shafts provided with vertical passages and having readily breakable plates covering the lower ends of said passages.

17. A concrete curb for shafts provided with vertical passages tapered at their lower ends, and plates covering the lower ends of said passages and adapted to be readily broken over the larger cross-section of the passages whereby a small or a large hole may be provided at will.

18. A curb for shafts provided with weight supporting means within it and limited to a distance of not more than about one hundred feet from the level of water therein, so as to permit the lowering of the water below said means and the removal thereof under air pressure.

19. A curb for shafts provided with weight supporting means on the inside, and with supplementary supporting means above said first mentioned means.

20. A curb for shafts provided with solid ballast supported within it, and adapted to be dropped into the bottom and excavated therefrom.

In witness whereof, we have hereunto signed our names in the presence of two subscribing witnesses.

DANIEL E. MORAN.
JOHN W. DOTY.
EDWIN S. JARRETT.

Witnesses:
DOMINGO A. USINA,
THEODORE T. SNELL.